United States Patent [19]

Hirabayashi

[11] Patent Number: 5,039,215
[45] Date of Patent: Aug. 13, 1991

[54] OPTICAL DEVICE INCLUDING AN OPTICAL LENS AND REFLECTORS WITH REFLECTIONS IN SERIES

[75] Inventor: Kaneo Hirabayashi, Nagano, Japan

[73] Assignees: Yugen Kaisha Bunda Denki; Kabushiki Kaisha Kambayashi Seisakusho, both of Nagano, Japan

[21] Appl. No.: 474,056

[22] PCT Filed: Sep. 19, 1989

[86] PCT No.: PCT/JP89/00950

§ 371 Date: May 2, 1990

§ 102(e) Date: May 2, 1990

[87] PCT Pub. No.: WO90/03588

PCT Pub. Date: Apr. 5, 1990

[30] Foreign Application Priority Data

Sep. 20, 1988 [JP] Japan .................................. 63-235899

[51] Int. Cl.5 ...................... G02B 7/198; G02B 23/02; G02B 23/04
[52] U.S. Cl. .................................... 359/430; 359/862; 359/223; 359/903; 359/629
[58] Field of Search ............... 350/568, 567, 618, 623, 350/632, DIG. 3, 172, 174, 486, 445

[56] References Cited

U.S. PATENT DOCUMENTS 2,985,749  5/1961  Johnson ........................ 350/DIG. 3
3,971,620  7/1976  Everett ................................. 350/568
4,448,500  5/1984  Marling et al. ..................... 350/172
4,655,591  4/1987  Kriz ..................................... 350/618
4,663,698  5/1987  Tomlinson ......................... 350/618

FOREIGN PATENT DOCUMENTS 552568    11/1957  Italy ..................................... 350/567
63-311317 12/1988  Japan .
1073      of 1878 United Kingdom ................. 350/567
16256     of 1907 United Kingdom ................. 350/567
470739    8/1937  United Kingdom ................. 350/567

Primary Examiner—Jon W. Henry

[57] ABSTRACT

The optical device is preferably used for a telescope, and has a pair of reflectors attached to a front end of a cylindrical section, so that objects can be searched or traced. The optical device has a first reflector provided in front of an object lens, which is provided at a front end of a rotatable cylindrical section. The first reflector reflects the light in a direction perpendicular to the optical axis of the object lens. A second reflector provided is close to the first reflector and the second reflector reflects the reflected light from the first reflector in parallel to the optical axis of the object lens. The first reflector can be rotated in a plane which is positioned between the first reflector and the second reflector and which is perpendicular to the optical axis of the object lens, and the second reflector can be independently rotated on the optical axis thereof.

14 Claims, 11 Drawing Sheets

FIG. 7
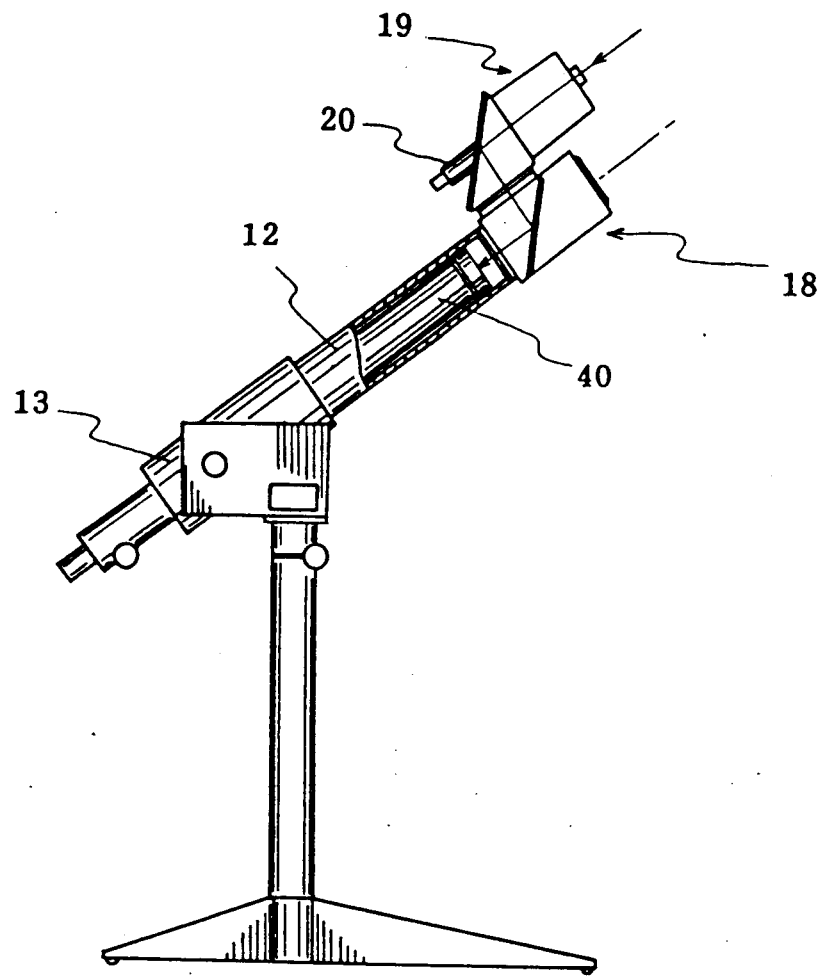
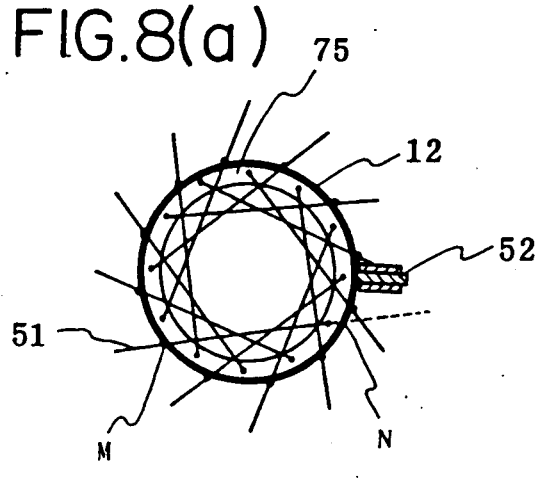
FIG. 8(a)
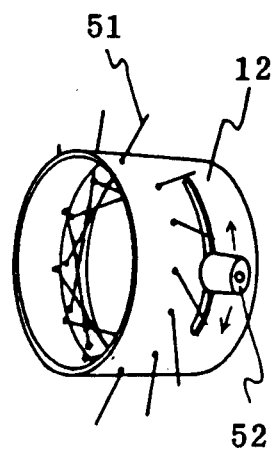
FIG. 8(b)

OPTICAL DEVICE INCLUDING AN OPTICAL LENS AND REFLECTORS WITH REFLECTIONS IN SERIES

FIELD OF TECHNOLOGY

The present invention relates to an optical device, and especially relates to an optical device having two reflectors in front of an object lens.

BACKGROUND OF TECHNOLOGY

An astronomical telescope, which is a representative of optical devices, having an object lens fixed at a front end of a cylindrical section and an eyepiece, which are provided on a straight line, is popularly used.

To observe celestrial bodies with such a telescope, first the cylindrical section should be set in parallel to the earth's axis, and then the telescope is directed to the object star by setting an equatorial mount of the telescope to the object star's declination and codeclination.

During this operation, the position of the eyepiece, when the telescope is set in parallel to the earth's axis is, different from the position thereof when the telescope catches the object star, therefore it is quite inconvenient for a physically handicapped person on a wheelchair.

When a camera is attached to the eyepiece to take a photograph, a long time exposure is sometimes required.

In this case, the whole of the telescope should be rotate on an axis parallel to the earth's axis in the sidereal time, and the position of the eyepiece of the starting rotation is different from the position of the finishing rotation.

A coude telescope whose eyepiece can be positioned at a fixed position is shown in FIG. 11.

The cylindrical section of the telescope shown in FIG. 11 is bent midway at a right angle and reflectors 38 and 38 are provided at the corners of the bent section.

Incident light into the front end of the cylindrical section 12 passes through an object lens (not shown) and is reflected on the reflectors 38 and 38 toward an eyepiece 26.

In this telescope, an axis X—X of a cylindrical section 12' can be kept in parallel to the earth's axis when the object lens is directed to an object star.

Further, the telescope can trace the object fixed star by rotating the cylindrical section 12' on the axis X—X parallel to the earth's axis in the sidereal time.

Because of keeping the axis X—X of the cylindrical section 12' parallel to the earth's axis, the position of the eyepiece can be fixed at one position.

In the telescope shown in FIG. 11, however, the incident light is reflected in the midway between the object lens and the eyepiece 26, so that an optical path therebetween is long and the structure is not improper for a telescope having a light visual range with large diameter and short focal length. Therefore, it is improper to observe dark fixed stars, nubulas, etc.

In a reflecting telescope shown in FIG. 12, a light reflected and focused on reflectors 41 and 42 is reflected on a reflector 43 to focus into an image at point F which is in front of an eyepiece 47. In this reflecting telescope, a cylindrical section thereof can be rotated on an axis Z—Z by a gear 45 to adjust declination, and, at the same time, the cylindrical section can be rotated on an axis Y—Y by a gear 44 to adjust codeclination during observation.

In this reflecting telescope, however, position of an eyepiece 47 is rotated on the axis Y—Y.

Further, an observation room in which the telescope is accommodated is required, and there must be provided a window, which can be opened and closed, in the ceiling section thereof.

Therefore, the cost for installing the telescope should be quite high.

The inventor of the present invention proposed a telescope, which solves the disadvantages of above described telescopes, which can shortened the optical path between an object lens and an eyepiece and which can keep a position of the eyepiece at one position while tracing fixed stars, in a specification of Japanese Patent Application No. 62-148656.

This telescope has, as shown in FIG. 13, a reflector 30 at a front end of a cylindrical section 12, and the cylindrical section 12 can be rotated by a driving means 13.

In this telescope, the reflector 30 reflects a light, which comes in the direction of a finder 20, in the direction parallel to an optical axis of an object lens (not shown) provided at the front end of the cylindrical section 12.

With this structure, an object star can be caught in a visual range without adjusting position of an eyepiece 26 by directing the finder 20 toward the object fixed star after setting the cylindrical section 12 to be parallel to the earth's axis, and a telescope having large diameter and short focal length can be provided.

Further, the telescope can trace the object star by rotating the cylindrical section 12 in the sidereal time keeping parallel to the earth's axis.

In the telescope shown in FIG. 13, the observable range is limited because of single reflector 30. To observe the unobservable range, a secondary reflector should be attached to the reflector 30.

The secondary reflector is fixed, so that the range, which can be observed without the secondary reflector, cannot be observed when the secondary reflector is attached.

Therefore, the secondary reflector sometimes should be attached or detached when the object star is changed.

Further, the direction of the secondary reflector does not coincide with the direction of the finder 20, so that it is necessary to direct the secondary reflector toward an object star considering the direction of the finder 20 (or the direction of the reflector 30).

Then object of the present invention is to provide an optical device, which can easily observe an object bodies positioned in any direction while keeping the position of the eyepiece at one position, and which can preferably shortened an optical path between an object lens and an eyepiece to get a light visual range.

DISCLOSURE OF THE INVENTION

The inventor of the present invention thought that two reflectors, which are respectively and rotatably attached in front of an object lens, are effective to achieve the object, and studied to get to the present invention.

Namely, an optical device of the present invention comprising, a first reflector provided in front of an object lens, which is provided at a front end of a rotatable cylindrical section, the first reflector reflects the light in the direction perpendicular to the optical axis of the object lens, and a second reflector provided close to the first reflector, the second reflector reflects the reflected light from the first reflector in parallel to the optical axis of the object lens, wherein the first reflector can be rotated in a plane which is positioned between the first reflector and the second reflector and which is perpendicular to the optical axis of the object lens, and the second reflector can be independently rotated on the optical axis thereof.

In the present invention, the connection between the first and second reflectors and/or the connection between the second reflector and the front end of the cylindrical section may be operatively connected by a pair of ring flanges which are fixed at each of the reflectors or the front end of the cylindrical section. A magnet is provided on the facing face of one of the ring flanges, whereby the other ring flange is attracted toward the one thereof to be connected by the magnet.

Further, there may be provided a bearing between said pair of ring flanges, so that the first reflector and/or the second reflector can be easily rotated by hand.

If there are provided a plurality of combinations of the first and second reflectors at the front end of the cylindrical section, a plurality of object bodies, whose positions are mutually different from one another, can be caught in one visual range to be observed at the same time.

The optical device having the first and second reflectors at the front end of the cylindrical section is preferably used as a polar axis telescope whose cylindrical section is set in parallel to the earth's axis, and can be rotated in the side-real time.

In the optical device with above described structure, the optical path between the object lens and the eyepiece can be preferably shortened and a telescope, etc. having large diameter, short focal length and light visual range can be provided because at least two reflectors, which are provided in front of the object lens at the front end of the cylindrical section so as to reflect incident light to the direction perpendicular to the incident direction thereof, are set close to each other and along the optical axis.

Further, the reflectors can be directed toward the object without moving the cylindrical section because the reflectors can be independently rotatable, so that the object, whose direction is different from the direction of the axis of the cylindrical section, can be observed without moving the position of the eyepiece. Therefore, even a physically handicapped person on a wheelchair can easily observe celestrial bodies or ecology of animals without moving his or her position.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein:

FIG. 7 shows a partial sectional side view of another situation of using the telescope shown in FIG. 1;

FIGS. 8(a) and 8(b) show respectively a sectional view and a perspective view of a jig use in the situation shown in FIG. 7;

PREFERRED EMBODIMENTS OF THE INVENTION

The present invention will now be described in detail with reference to the drawings.

Figure 1:
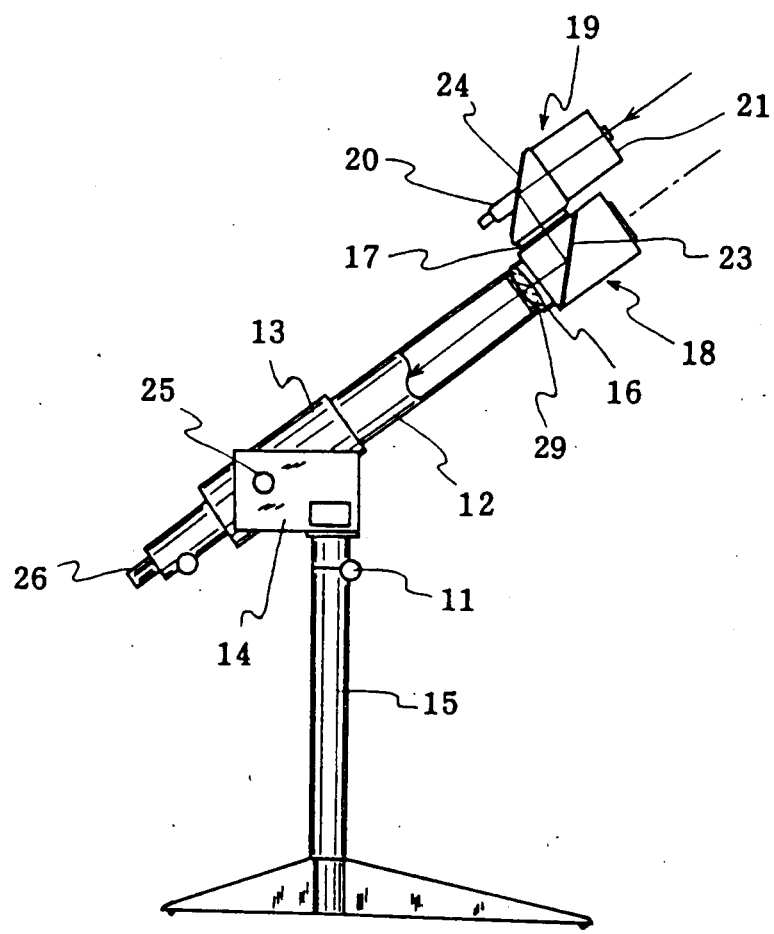
FIG. 1 shows a partial sectional side view of an astronomical telescope of one embodiment of the present invention.

In an astronomical telescope shown in FIG. 1, a supporting section 14 provided on a leg 15 supports a driving section 13. The supporting section 14 can be rotated on the leg 15 when an adjust screw 11 is loosened.

The angle of elevation of the driving section 13 can be adjustable with an adjust screw 25 provided in the supporting section 14.

A cylindrical section 12 as a telescope proper is inserted through the driving section 13, so that the cylindrical section 12 is rotated by the driving section 13. There is provided an object lens 29 at one end of the cylindrical section 12 and an eyepiece 26 is provided at the other end thereof.

A first reflector 19 and a second reflector 18 are provided in front of the object lens 29 and at the front end of the cylindrical section 12, and there is provided a finder 20, which is set in parallel to the reflecting direction of the first reflector 19, on the outer side face of the first reflector 19.

Figure 2:
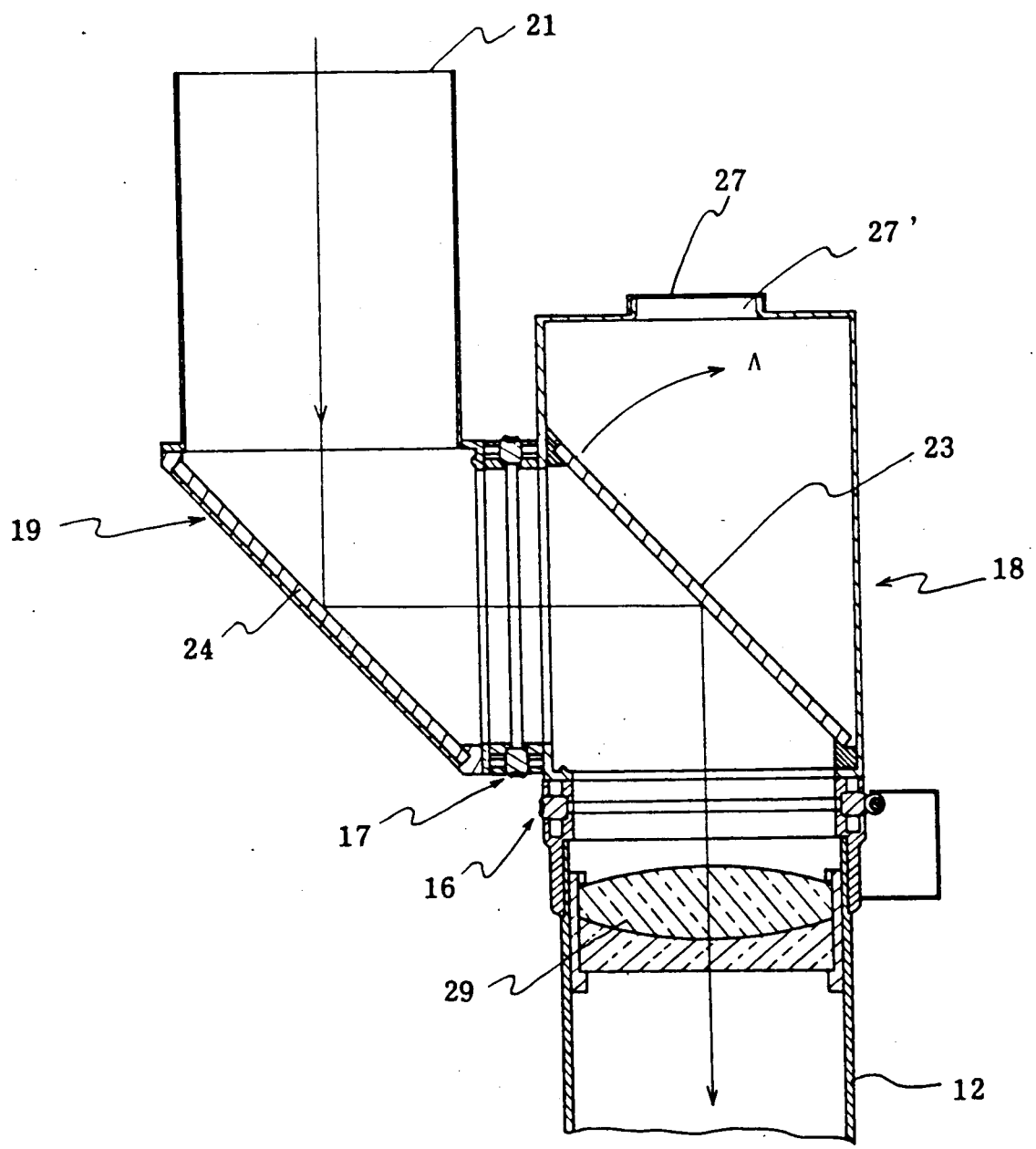
FIG. 2 shows a sectional view of first and second reflectors which are attached at the front end of the cylindrical section of the telescope shown in FIG. 1.

The first reflector 19, as shown in FIG. 2, is close to and connected to the second reflector 18 by a flange section 17. The second reflector 18 is connected to the front end of the cylindrical section 12 by a flange section 16.

The first reflector 19 and the second reflector 18 respectively have mirrors 24 and 23.

The mirror 24 is attached to the first reflector 19 so as to reflect the incident light from the opening 21 of the first reflector 19 toward the direction perpendicular to the optical axis of the object lens 29.

The mirror 23 is attached to the second reflector 18 so as to reflect the reflected light from the mirror 24 of the first reflector 19 (the incident light for the mirror 23) to the direction parallel to the optical axis of the object lens 29.

Note that, the mirror 23 can be rotated to the direction indicated by an arrow A when a cap 27 of the second reflector 18 is detached to observe through a small hole 27'.

The second reflector 18 can be independently rotated with respect to the front end of the cylindrical section 12 by the flange section 16. The flange section 16 is rotated by a worm gear driven by a pulse motor, etc., and its rotation angle can be detected by a rotation angle detector.

The length (thickness) of the flange section 17 between the first reflector 19 and the second reflector 18 is preferably short (thin). If the flange section 17 is thick, the rotational moment of the first reflector becomes large because the first reflector 19, as shown in FIG. 1, is projected to the direction perpendicular to the rotational (optical) axis of the cylindrical section 12.

In a conventional bearing, a pair of thick rings are piled in the direction of thickness. If such a bearing is used as the flange section 17, it is quite difficult to make the flange section 17 thin.

Therefore, the flange section 17 has the structure shown in FIG. 3 in this embodiment.

Figure 3A:
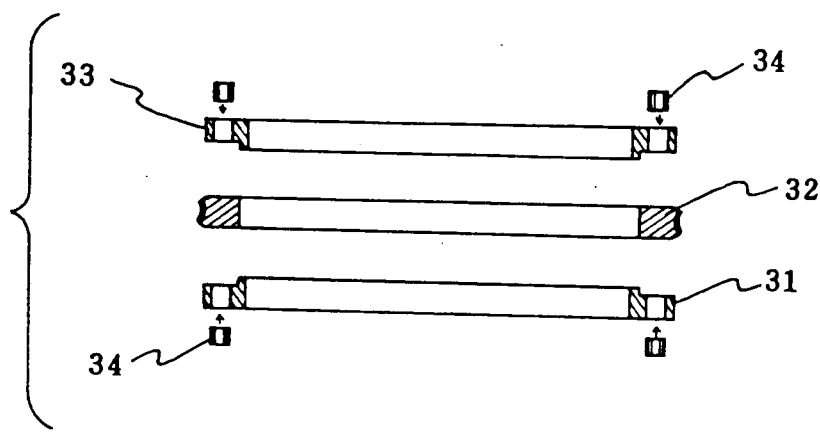
FIGS. 3(a), 3(b) and 3(c) are an explanation view showing structure of ring flanges connecting the first and second reflectors.
Figure 3B:
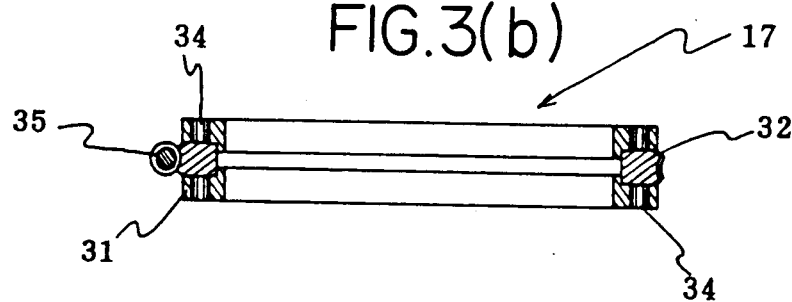
Figure 3C:
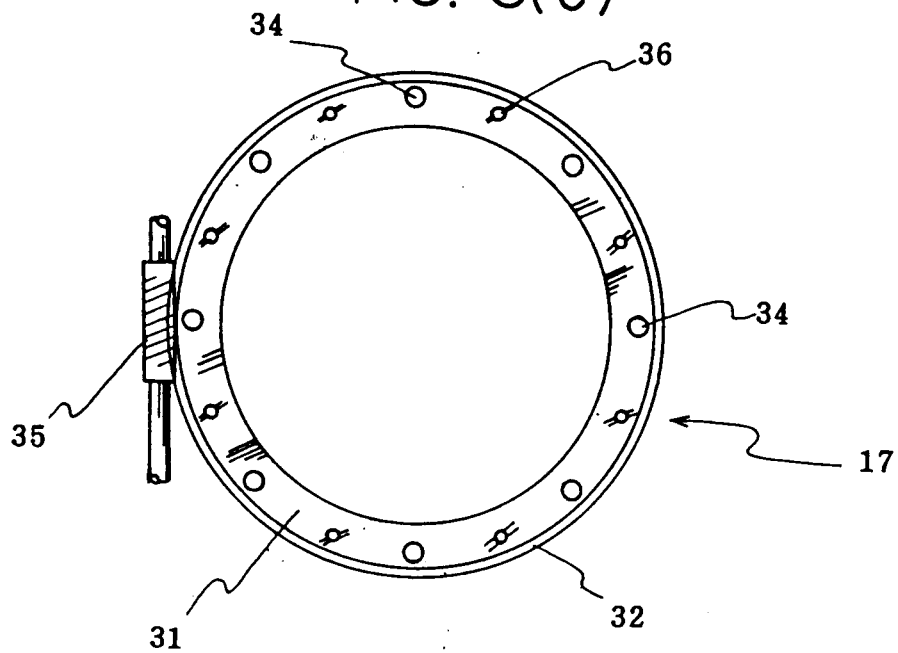

FIG. 3(a) shows a sectional view of the members of the flange section 17, FIG. 3(b) shows a sectional view of the flange section 17, and FIG. 3(c) shows a plan view of the flange section 17 from a ring flange 31 side.

Ring flanges 33 and 31, in which magnets are provided on one of the facing faces (or flange-faces) thereof, and are fixed to the first reflector 19 or the second reflector 18 by screws inserted in holes 36, and a ring flange 32 made of magnetizable material is inserted between the ring flanges 33 and 31.

Note that, the ring flanges 33 and 31 are made of aluminum plastics, etc. to be lighter.

The ring flange 32 (or the magnetizable flange 32) made of magnetizable material has teeth, which can be engaged with a worm gear 35, on the side face thereof, and can be rotated by the worm gear 35.

The faces of the magnetizable flange 32 and ring flanges 33 and 31 facing one another are finished precisely, so that the magnetizable flange 32 can be rotated very smoothly.

The ring flange 33, which is fixed to the first reflector 19, can be rotated together with the magnetizable flange 32.

In the flange section 17 shown in FIG. 3, the first reflector 19 can be easily rotated by the worm gear 35 driven by a pulse motor, etc., and the first reflector 19 can be rotated to a prescribed position and then held in stationary status by stopping the motor without using a stopping means such as a screw.

Figure 4A:
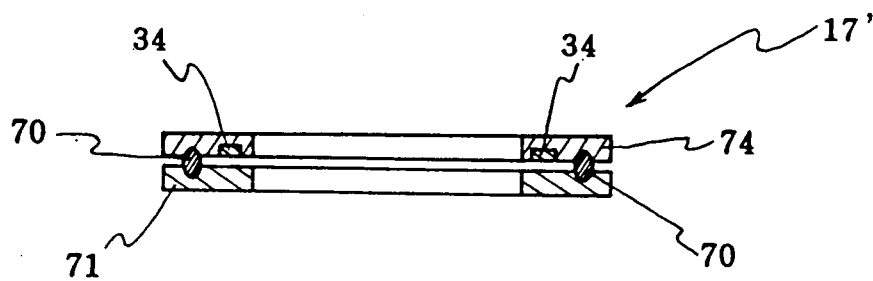
FIGS. 4(a), 4(b) and 4(c) are an explanation view showing the improvement of the ring flanges shown in FIG. 3.
Figure 4B:
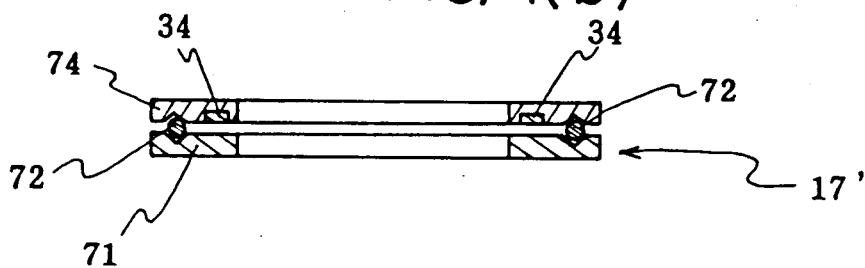

But it is slightly hard to rotate the first reflector 19 when it is manually moved or when the flange section 17 is the one shown in FIG. 3, so that it will be easier to manually move the first reflector 19, the flange section 17' shown in FIG. 4 is used.

FIGS. 4 (a) and (b) show sectional views of the flange section 17' Rotors are provided between a ring flange 74, which has magnets 34 on the flange face thereof, and a ring flange 71, which is made of magnetizable material such as iron and which is attracted by the magnets 34.

The rotors may be oil-free rotors 70 shown in FIG. 4(a) or rollers shown in FIG. 4 (b).

Figure 4C:
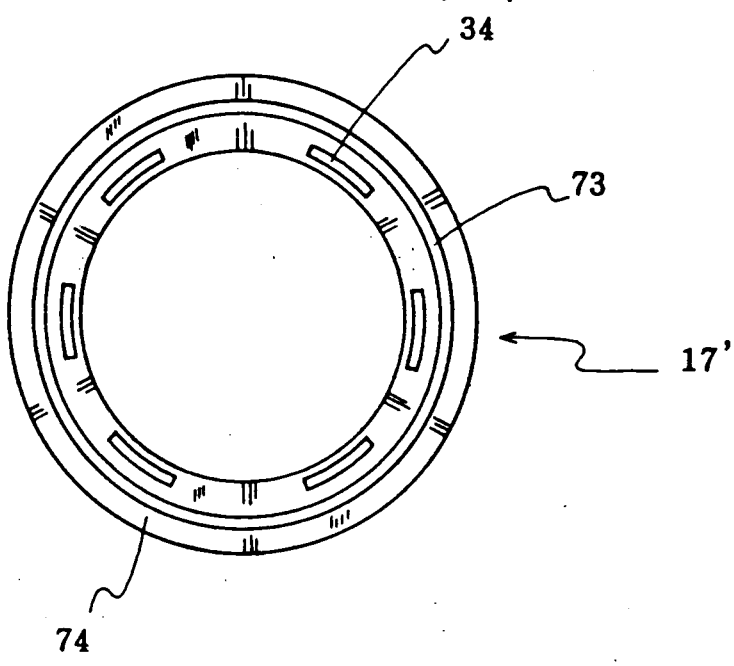

The one part of the rotors as shown in FIG. 4(c) of the plan view of the ring flange 74 are inserted into a ring groove formed on the flange face thereof. The remaining part thereof is inserted into a ring groove formed on the ring flange 72.

Note that, for example, sintered metal in which oil is impregnated may be used as the oil-free rotors 70.

With this type of flange section 17', the first reflector can be easily rotated by hand.

Of course, the first reflector 19 can be rotated by a worm gear, which engages with teeth grooved on the side face thereof, driven by a pulse motor, etc.

In this embodiment, the connection between the second reflector 18 and the front end section of the cylindrical section 12 is the same as the connection between the first reflector 19 and the second reflector 18 (see FIG. 3).

In the telescope in this embodiment, the first reflector 19 and the second reflector 18 can be independently rotated to any rotational angle by pulse motors, and the rotational angle of the first reflector 19 and the second reflector 18 can be detected by a detector and indicated by a display unit.

Further, the first reflector 19 and the second reflector 18 can be independently rotated for a prescribed angle by inputting prescribed number of pulses into the pulse motors.

Figure 5:
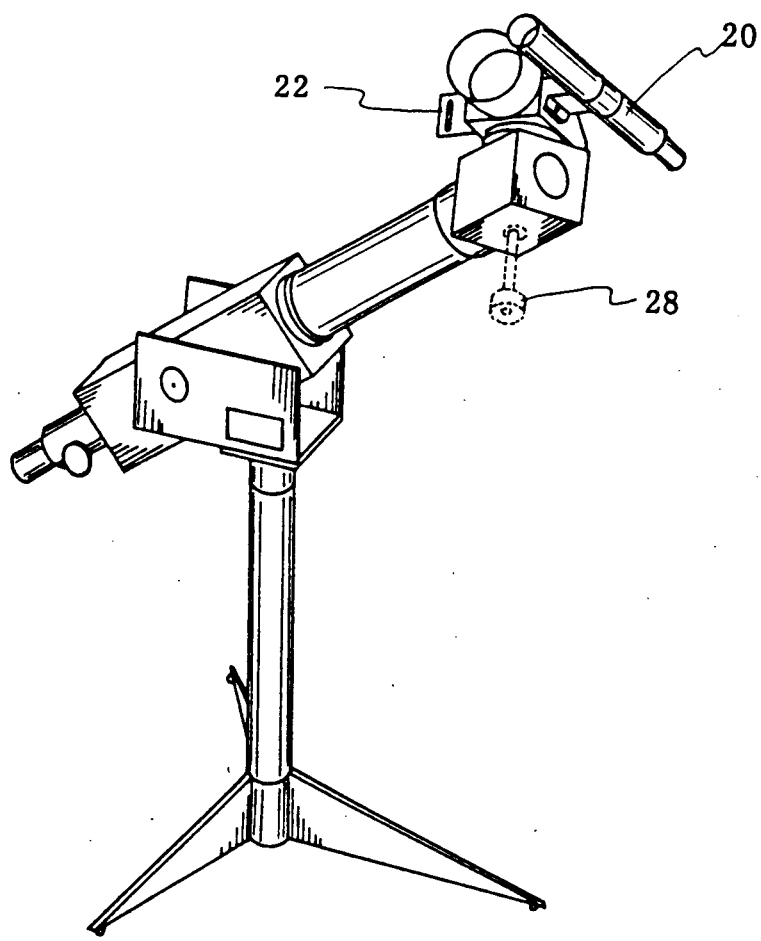
FIGS. 5, 6(a), 6(b) and 6(c) are perspective views showing situations of using the telescope shown in FIG. 1.

While a camera for celestrial bodies can be attached on a base 22 of the first reflector 19 of the telescope of this embodiment beside the finder 20 as shown in FIG. 5, the weight is sometimes not balanced. In this case, a balancer 18 is preferably attached to the second reflector 28.

Steps for observing an object star in the middle latitude region of the northen hemisphere with the telescope of this embodiment will be described.

First, the leg 15 is fixed at an observation place, the cap 27 is removed from the second reflector 18, and the mirror 23 is rotated in the direction of the arrow A (see FIG. 2) in order that the light in parallel to the optical axis of the object lens 29 can be introduced through the small hole 27'.

The small hole 27' is directed to the North Star, and then the elevation angle of the cylindrical section 12 is adjusted by the screws 11 and 25 so as to catch the North Star in the visual range of the eyepiece 26.

When the North Star is caught in the center of the visual range of the eyepiece 26, the cylindrical section 12 is set in parallel to the earth's axis.

Then the cap 27 and the mirror 23 are set back to initial position, and a fixed star, whose celestrial location (declination and codeclination) is known, is caught in the center of the visual range of the finder 20 by rotating the first reflector 19 and the second reflector 18.

In this operation, the rotational angle of the first reflector 19 and the second reflector 18 are detected by the detector, and the rotational angle thereof are adjusted to the celestrial location of the fixed star in the center of the visual range of the finder 20.

In case of observing the star, whose location is known, with the telescope which is completely set, the object star can be easily caught by inputting data of the location into a control unit of the pulse motors of the first reflector 19 and the second reflector 18 so as to rotate the first reflector 19 and the second reflector 18 for a prescribed angle.

A location of a certain star in the center of the visual range of the finder 20, which is caught by rotating the first reflector 19 and the second reflector 18, can be detected soon by the detectors attached to each of the reflectors.

Even if the first reflector 19 and the second reflector 18 are rotated to catch an object star, the cylindrical section 12 is always kept in parallel to the earth's axis as shown in FIG. 5.

With this structure, the position of the eyepiece 26 can be always kept at one position.

If the cylindrical section 12 is driven by the drive section 13 in the sidereal time, the first reflector 19 and the second reflector 18 attached to the front end of the cylindrical section 12 and the eyepiece 26 can be rotated in the sidereal time.

Therefore, the fixed star in the visual range of the eyepiece can be observed for a long time, so that photographing of nubulas, which require a long time exposure, can be executed by attaching a camera to the eyepiece 26.

In the meantime, an astronomical observation is generally preferred in the winter due to the long night and clear air but an observation room (dome) cannot be warmed in the cold winter.

In the conventional telescopes, the front end of the telescope should be movable in every direction because of searching or tracing object stars, and the observation dome should open widely, so that the inside of the observation dome cannot be warmed enough. Even if the inside thereof is warmed, the air about the opening thereof flows and condition of observation sometimes becomes worse.

Figure 6A:
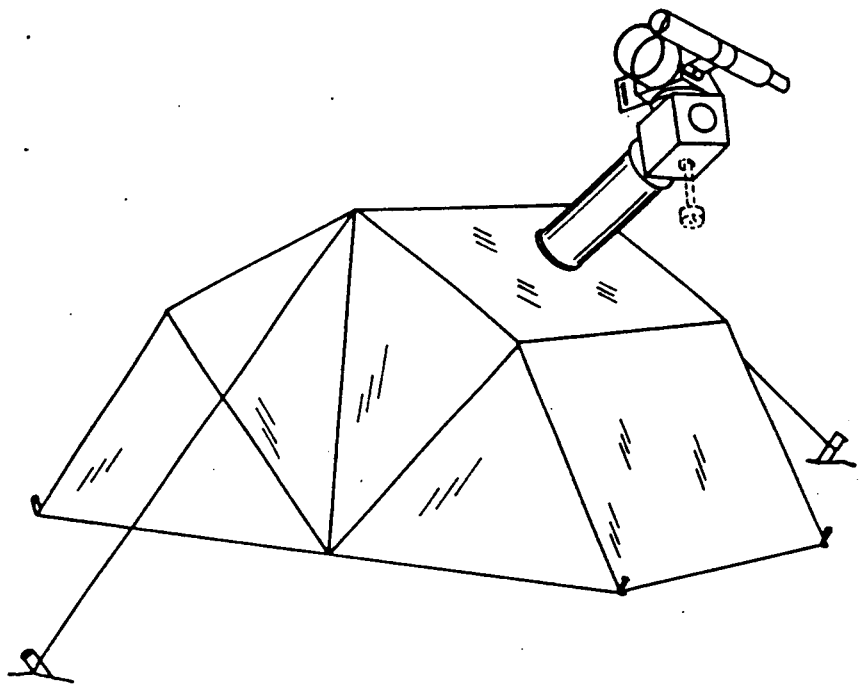
Figure 6B:
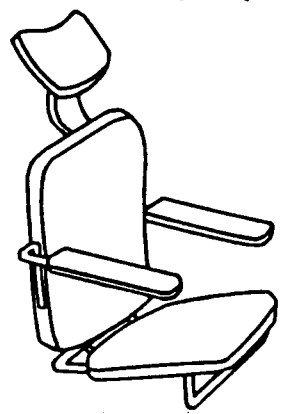
Figure 6C:
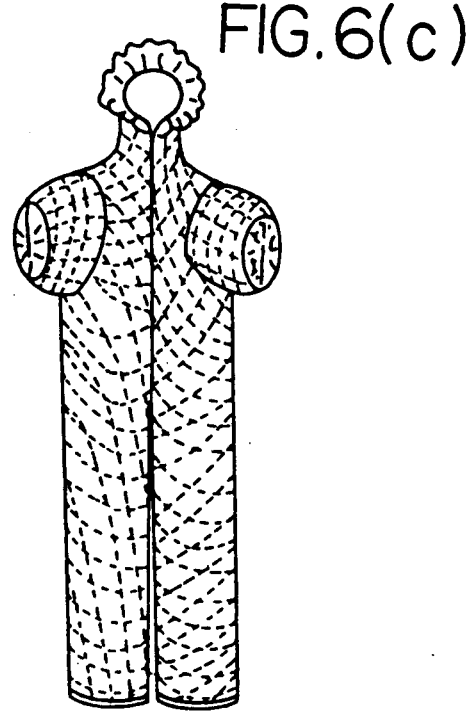

In the telescope of this embodiment, as shown in FIG. 6 (a), the first reflector 19 and the second reflector 18 are projected from a roof section of a tent, so that object stars can be searched or traced without moving the cylindrical section 12 to any directions. Further, no large opening is required in the roof section thereof and the opening can be closed tightly, and heated air inside does not affect the reflectors.

An observer can observe in the warm room, and he or she can observe sitting in a chair shown in FIG. 6 (b) because the position of the eyepiece 26 is not changed.

Note that, if there is no heating means or the heating means is not enough, the observer can be protected against the cold by wearing winter clothes shown in FIG. 6 (c).

Next, another embodiment, which includes a conventional telescope, having the same effectiveness of the telescope of the former embodiment is shown in FIG. 7.

The telescope shown in FIG. 7 has the first reflector 19 with the finder 20 and the second reflector 18, which are attached to the front end of the cylindrical section 12, which is inserted into the drive section 13 for rotating in the sidereal time.

There is a conventional telescope 40 having the object lens and the eyepiece in the cylindrical section 12.

Note that, the telescope 40 inserted in the cylindrical section 12 can be rotated together with the cylindrical section In the telescope shown in FIG. 7, the optical axis of the telescope 40 inserted in the cylindrical section 12 and the axis of the cylindrical section 12 should coincide with each other.

Therefore, at least one (preferably two) jig shown in FIG. 8 is provided in the cylindrical section 12 so as to easily coincide the optical axis of the telescope 40 with the axis of the cylindrical section 12.

The one end of the jig shown in FIG. 8 has a plurality of pins 51 whose one ends are fixed at a ring plate 75, which can contact the inner face of the cylindrical section 12 and can be rotated by a lever 52. The other ends thereof are fixed at the outer face of the cylindrical section 12.

If the points at which the extended image lines of the pin 51 cross the cylindrical section 12 are the defined as points M and N, the length between the points M and N for all pin are same.

In the above described telescopes, two fixed stars, whose locations (declination and codeclination) are apart from each other, cannot be caught in one visual range. Therefore, the first reflector 19 and the second reflector 18 should be adjusted again so as to direct the first reflector 19 to the second star after completing observation of the first star.

Figure 9:
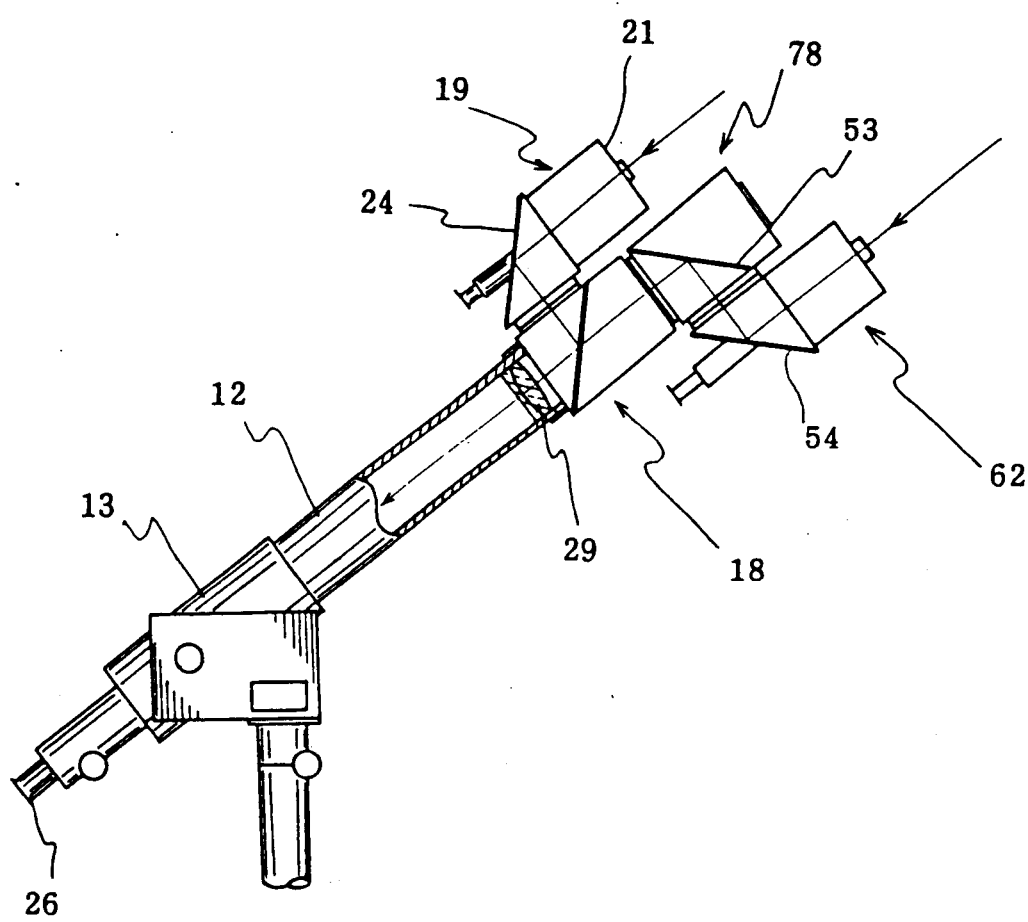
FIG. 9 shows a partial sectional side view of another embodiment of the present invention.

If a telescope shown in FIG. 9 is used, two fixed stars, whose locations (declination and codeclination) are apart from each other, can be observed at the same time.

The telescope has another pair of reflectors 62 and 78, which are attached to the front end of the second reflector 18 of the pair of reflectors 18 and 19.

Figure 10:
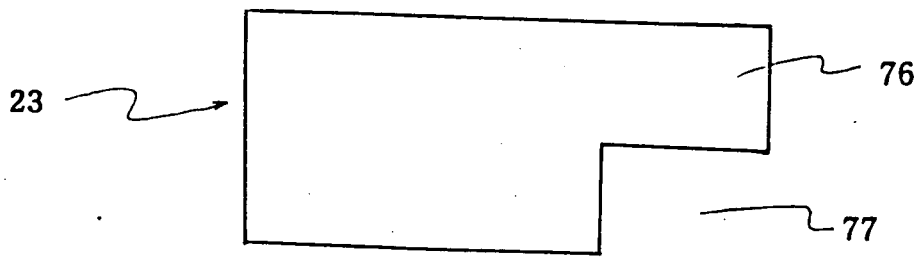
FIG. 10 shows a front view of a reflector 23 for the telescope shown in FIG. 9.
Figure 11:
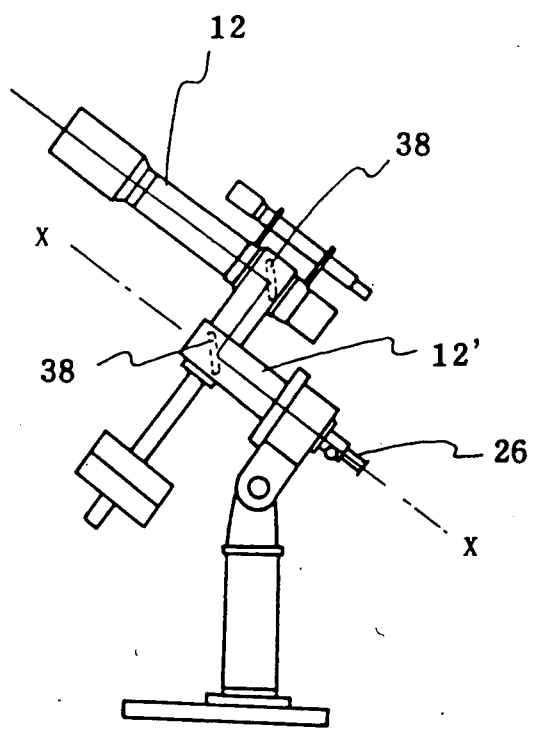
FIGS. 11-13 show side views and a sectional view of conventional telescopes.
Figure 12:
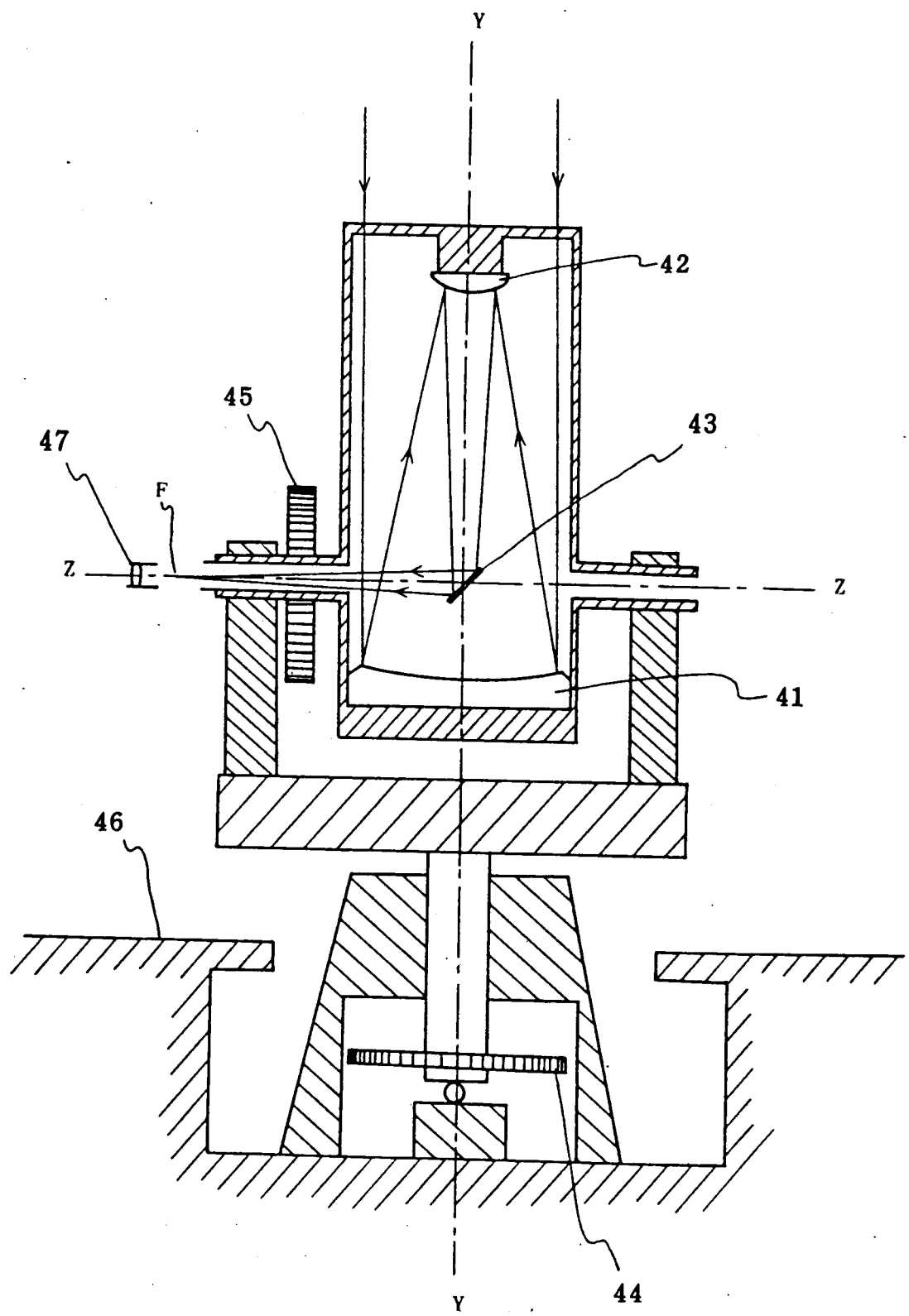
Figure 13:
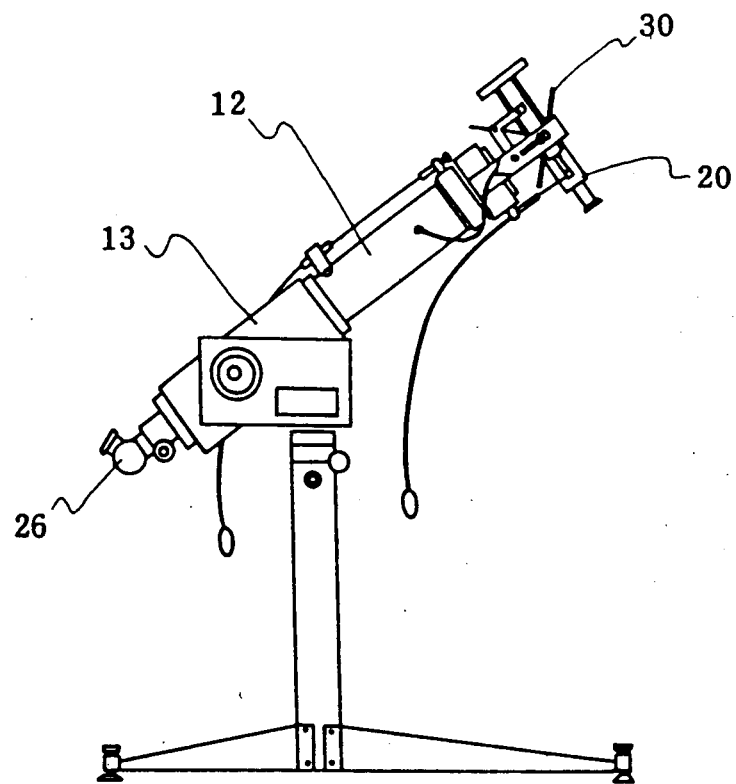

A part of the mirror of the second reflector 18 of the telescope is formed as a cut section 77 as shown in FIG. 10.

In this type of telescope, the incident light of the first reflector 19 is reflected on the mirror 24 of the first reflector 19 toward the direction perpendicular to the optical axis of the object lens 29, and it is further reflected on a projected section 76 of the mirror 23 of the second reflector 18 toward the direction in parallel to the optical axis of the object lens 29.

While, in another pair of reflectors 62 and 78, the incident light of the first reflector 62 is reflected on a mirror 54 toward the direction perpendicular to the optical axis of the object lens 29, and it is further reflected on a mirror 53 of the second reflector 78 toward the direction in parallel to the optical axis of the object lens 29.

The reflected light reflected on the projected section 76 of the mirror 23 of the second reflector 18 and the reflected light reflected on the mirror 53 of the second reflector 78 and passing through the cut section 77 are introduced to the eyepiece 26.

Therefore, two fixed stars, whose locations are different from each other, can be caught at the same time.

Scale of nebulas, color of stars, spectra, etc, can be compared at the same time.

Note that, if a plane mirror is used, without using the mirror shown in FIG. 10, the mirror 23 may be rotatable in the direction indicated by the arrow A of FIG. 2, so that a star in the direction of the first reflector 19 and another star in the direction of the first reflector 62 can be alternately observed with the rotation of the mirror 23.

The optical device of the present invention can be applicated to a terrestrial telescope for observing animals' ecology, etc., or in an adapter for attaching a finder to a camera, etc. besides astronomical telescopes.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. An optical device comprising:
    a first reflector provided in front of an object lens, the object lens having an optical axis, the first reflector being provided at a front end of a rotatable cylindrical section, said first reflector reflects light in a direction generally perpendicular to the optical axis of said object lens;

a second reflector having an optical axis and being provided close to said first reflector, said second reflector reflects light reflected from said first reflector in a direction generally in parallel to the optical axis of said object lens;

first connection means between the first reflector and the front end of the cylindrical section for rotating said first reflector in a plane generally perpendicular to the optical axis of the object lens;

second connection means between the first reflector and the second reflector for rotating the second reflector about the optical axis thereof, the first and second reflectors being independently rotatable; and a pair of ring flanges being provided for at least one of the first connection means and the second connection means and a magnet provided on a face of one of the ring flanges, the magnet attracting the other of said ring flanges to the one ring flange.

2. The optical device according to claim 1, further comprising a bearing provided between the ring flanges.

3. The optical device according to claim 1, further comprising a third reflector and a fourth reflector, the first and second reflectors being provided as a first pair and the third and fourth reflectors being provided as a second pair.

4. The optical device according to claim 3, wherein the third reflector is provided at the front end of the rotatable cylindrical section and the fourth reflector is provided close to the third reflector, the third reflector being rotatable in a plane generally perpendicular to the optical axis of the object lens and the fourth reflector being rotatable about an optical axis thereof, the third and fourth reflectors being independently rotatable.

5. The optical device according to claim 1, wherein the cylindrical section is a portion of a polar axis telescope which can be set generally parallel to the axis of the earth and which can be rotated in sidereal time.

6. The optical device according to claim 1, wherein a second pair of ring flanges are provided with the first pair being provided for the first connection means and the second pair being provided for the second connection means, the second pair of flanges further having a second magnet provided on a face of one of the ring flanges, the second magnet attracting the other ring flange of the second pair of ring flanges to the one ring flange of the second pair of ring flanges.

7. The optical device according to claim 6, wherein at least one of the first and second magnets have teeth formed along an edge thereof and wherein the device further comprises at least one worm gear engageable with the teeth of the at least one magnet to thereby rotate the at least one magnet.

8. The optical device according to claim 6, wherein at least one of the first and second pair of ring flanges have mating grooves formed in each of the ring flanges and further comprising one of a rotor and a plurality of rollers provided in the grooves of each of the ring flanges.

9. The optical device according to claim 1, wherein the magnet has teeth formed along an edge thereof and wherein the device further comprises means engageable with the teeth for rotating the magnet.

10. The optical device according to claim 9, wherein the means for rotating the magnet comprises a worm gear.

11. The optical device according to claim 1, wherein the pair of ring flanges have mating grooves defined therein and wherein one of a rotor and a plurality of rollers is provided in the grooves of each of the ring flanges.

12. An optical device comprising:

a first reflector provided in front of an object lens, the object lens having an optical axis, the first reflector being provided at a front end of a rotatable cylindrical section, said first reflector reflects light in a direction generally perpendicular to the optical axis of said object lens;

a second reflector having an optical axis and being provided close to said first reflector, said second reflector reflects light reflected from said first reflector in a direction generally in parallel to the optical axis of said object lens, the first and second reflector being provided as a first reflector pair;

a third reflector provided at the front end of the rotatable cylindrical section, the third reflector reflects light in a direction generally perpendicular to the optical axis of said object lens;

a fourth reflector provided close to the third reflector, the fourth reflector reflects light reflected from said fourth reflector in a direction generally in parallel to the optical axis of said object lens, the third and fourth reflector being provided as a second reflector pair;

first connection means between the first reflector and the front end of the cylindrical section for rotating the first reflector in a plane generally perpendicular to the optical axis of the object lens;

second connection means between the first reflector and the second reflector for rotating the second reflector about the optical axis thereof;

third connection means between the third reflector and the front end of the cylindrical section for rotating the third reflector in a plane generally perpendicular to the optical axis of the object lens; and fourth connection means between the third reflector and the fourth reflector for rotating the fourth reflector about the optical axis thereof;

the first, second, third and fourth reflectors being rotatable independently of one another.

13. The optical device according to claim 12, wherein the first reflector comprises a mirror having an opening defined therein, light being exposed between the object lens and the third reflector through the opening in the mirror.

14. The optical device according to claim 12, wherein the clyindrical section is a portion of a polar axis telescope which can be set generally parallel to the axis of the earth and which can be rotated in sidereal time.

* * * * *